United States Patent [19]

DeMichele et al.

[11] Patent Number: 5,223,285
[45] Date of Patent: Jun. 29, 1993

[54] NUTRITIONAL PRODUCT FOR PULMONARY PATIENTS

[75] Inventors: Stephen J. DeMichele, Dublin; Timothy J. Gregory, Gahanna, both of Ohio

[73] Assignee: Abbott Laboratories, Abbott Park, Ill.

[21] Appl. No.: 860,857

[22] Filed: Mar. 31, 1992

[51] Int. Cl.$^5$ .............................................. A23L 1/303
[52] U.S. Cl. ..................... 426/72; 426/800; 426/801; 426/73; 514/904
[58] Field of Search .................. 426/800, 801, 73, 72; 514/904

[56] References Cited

U.S. PATENT DOCUMENTS

| | | | |
|---|---|---|---|
| 4,216,236 | 8/1980 | Mueller | 426/73 |
| 4,526,793 | 7/1985 | Ingenbleek | 426/72 |
| 4,670,285 | 6/1987 | Clandinin | 426/801 |
| 4,737,489 | 4/1988 | Wurtman | 514/419 |
| 4,775,665 | 10/1988 | Wurtman | 514/419 |
| 4,832,975 | 5/1989 | Yang | 426/603 |
| 4,874,629 | 10/1989 | Chang | 426/601 |
| 4,880,912 | 11/1989 | Callison | 530/361 |
| 4,920,098 | 4/1990 | Cotter | 514/560 |
| 4,977,187 | 12/1990 | Horrobin | 514/560 |
| 5,013,569 | 5/1991 | Rubin | 426/801 |
| 5,023,100 | 6/1991 | Chang | 426/601 |
| 5,053,387 | 10/1991 | Alexander | 514/561 |
| 5,059,622 | 10/1991 | Sears | 514/549 |
| 5,106,639 | 4/1992 | Lee | 426/72 |
| 5,116,819 | 5/1992 | Trimbo et al. | 514/21 |
| 5,120,760 | 6/1992 | Horrobin | 514/560 |

FOREIGN PATENT DOCUMENTS

| | | | |
|---|---|---|---|
| 395865 | 7/1990 | European Pat. Off. | |
| 3603000 | 8/1987 | Fed. Rep. of Germany | 426/801 |
| 2604606 | 4/1988 | France | 426/73 |
| 2226569 | 4/1990 | United Kingdom | 426/801 |

OTHER PUBLICATIONS

Specialized Nutrition For Pulmonary Patients, ©1986, Ross Laboratories.

Carnation® NutriVent ™ Complete Nutrition For Pulmonary Patients, ©1991, Clintec Nutrition Co.

Foegh et al., "Free Radicals, Arachidonic Acid Metabolites, and Nutrition", Journal of Parenteral and Enteral Nutrition, vol. 14, No. 5, pp. 218S–221S (1990).

Murray et al., "Effects of a Fish Oil Diet on Pigs' Cardiopulmonary Response to Bacteremia", Journal of Parenteral and Enteral Nutrition, vol. 15, No. 2, pp. 152–158 (1991).

"Antioxidants Nutrition's Newest Superheroes", Drug Topics, Mar. 1991.

Zimmerman, "Therapeutic Application of Oxygen Radical Scavengers", Chest, Sep. 1991/Supplement, pp. 189S–191S.

Chow, "Vitamin E and Oxidative Stress", Free Radical Biology & Medicine, vol. 11, pp. 215–232 (1991).

Bast et al., "Oxidants and Antioxidants: State of the Art", The American Journal of Medicine, Sep. 1991, pp. 3C–2S to 3C–13S.

*Primary Examiner*—Carolyn Paden
*Attorney, Agent, or Firm*—Lonnie R. Drayer; Donald O. Nickey

[57] ABSTRACT

A liquid nutritional product for enteral feeding contains a fat source which provides desirable effects when fed to pulmonary patients. The fat source having by weight a ratio of [n-(6) to n-(3)] fatty acids from the group consisting of Linoleic acid (18:2n6), Gamma-Linolenic acid (18:3n6), and Arachidonic acid (20:4n6) to fatty acids from the group consisting of Alpha-Linolenic acid (18:3n3), Stearidonic acid (18:4n3), Eicosapentaenoic acid (20:5n3), Docosapentaenoic acid (22:5n3) and Docosahexaenoic acid (22:6n3) in the range of about 1.5 to about 3.0, a ratio of Linoleic acid (18:2n6) to Alpha-Linolenic acid (18:3n3) in the range of about 3.0 to about 10.0, and a ratio of the sum of Eicosapentaenoic acid (20:5n3) and Docosahexaenoic acid (22:6n3) to Gamma-Linolenic acid (18:3n6) in the range of about 1.0 to about 10.0. In a preferred embodiment the nutritional product contains quantities of nutrients having anti-oxidant properties in vivo, such as beta-carotene, vitamin E, vitamin C, selenium, and taurine.

27 Claims, 6 Drawing Sheets

NUTRITIONAL PRODUCT FOR PULMONARY PATIENTS

FIELD OF THE INVENTION

The present invention relates generally to a liquid nutritional product for enteral feeding of pulmonary patients and more specifically to a medical nutritional product having a fat blend which is especially beneficial to patients with respiratory insufficiency. The present invention also relates to a method of improving pulmonary function in a mammalian creature having respiratory insuffiency by enterally feeding the liquid nutritional product.

BACKGROUND OF THE INVENTION

Nutrition is an important consideration for the patient with respiratory insufficiency. The incidence of malnutrition is high, both in patients with chronic respiratory disease and those hospitalized with respiratory failure. Malnourished patients have an increased susceptibility to infection, a complication often resulting in mortality and morbidity in pulmonary patients. Nutritional support helps to meet the caloric needs for respiration and to maintain structure and function of respiratory muscle. In addition, the maintenance of nutritional status has been associated with an increased ability to wean patients from mechanical ventilatory support.

Published reports of respiratory failure precipitated by high-carbohydrate feedings have drawn attention to the carbohydrate and fat content of the patient's diet. In patients with chronic or acute retention of carbon dioxide (hypercapnia), one goal of dietary therapy is to decrease carbon dioxide production. High carbon dioxide production can precipitate acute respiratory failure in patients with chronic pulmonary disease and can complicate weaning in ventilator-dependent patients. Because the complete combustion of fat yields less carbon dioxide than combustion of either carbohydrate or protein, a high-fat diet may be preferable for patients with pulmonary disease.

Malnutrition is recognized as a major problem in hospitalized patients as well as in outpatients with chronic diseases of long duration. There is increasing evidence that patients with chronic obstructive pulmonary disease (COPD) and respiratory failure suffer from malnutrition. Symptoms of respiratory disease may limit caloric and nutrient intake, resulting in deterioration of nutritional status over time. Poor nutritional status, in turn, negatively affects pulmonary function.

The following observations are pertinent to the nutritional care of patients with lung disease:

(a) Weight loss occurs in 25% to 65% of patients as a result of inadequate caloric intake due to anorexia, shortness of breath, or gastrointestinal distress, or 2) increased caloric requirements due to the excess work of breathing;

(b) In addition to having anthropometric abnormalities, these patients often have depressed biochemical measurements of nutritional status;

(c) When caloric intake is decreased, the body cannibalizes muscles, including the respiratory muscles, to meet energy needs;

(d) As a consequence of malnutrition, the energy content and strength of respiratory muscles decrease;

(e) The degree of nutritional depletion is correlated with the severity of chronic lung disease;

(f) In patients with chronic pulmonary disease, depressed nutritional status is associated with respitory failure and right heart failure (cor pulmonale);

(g) Semistarvation depresses hypoxic ventilatory response;

(h) Malnutrition lowers resistance to infection, which is a common complication in pulmonary disease; and (i) Improved nutritional status has been associated in an increased ability to wean from the respirator.

Patients with respiratory disease have specific nutritional needs. The goal of nutritional support is to provide required nutrients without further compromising respiratory, function. Although dietary management varies according to individual needs, the following dietary guidelines should be observed, especially for patients with hypercapnia:

(a) Increase fat consumption and decrease carbohydrate intake to reduce carbon dioxide production and lower the respiratory quotient;

(b) Meet caloric requirements but do not exceed them, because overfeeding calories increases carbon dioxide production;

(c) Avoid excessive protein intake because it may increase ventilatory drive in patients who have limited ability to respond;

(d) Monitor fluid requirements, restricting fluid intake as needed for patients with heart failure; and (e) Provide adequate amounts of phosphorus, because acute hypophosphatemia may cause respiratory failure.

Chronic obstructive pulmonary disease, chronic airway obstruction, and chronic obstructive lung disease are terms used to describe a group of disorders characterized by limitation of airflow in the lung and pulmonary insufficiency. Two disease entities that dominate the spectrum of disorders known as COPD are chronic bronchitis and pulmonary emphysema. Chronic bronchitis is characterized by excessive mucus secretion in the bronchial tree, with chronic or recurrent productive cough for two or more consecutive years. In emphysema, air spaces distal to the terminal bronchioles are enlarged, and their walls undergo destructive changes. Both these diseases result in obstruction of airflow, particularly during expiration.

Patients with COPD, which usually is a mixture of emphysema and chronic bronchitis, develop various degrees of respiratory muscle fatigue, hyperventilation, carbon dioxide retention (hypercapnia), and oxygen depletion (hypoxemia). Hypoxemia may cause constriction of the pulmonary arteries, resulting in increased pulmonary artery pressure. Chronic elevation of pulmonary artery pressure can cause episodes of cor pulmonale.

Hypoventilatory respiratory failure is recognized clinically when the partial pressure of carbon dioxide ($PaCO_2$) is greater than 50 mm Hg and/or the partial pressure of oxygen ($PaO_2$) is less than 50 mm Hg. In respiratory failure, the respiratory system does not provide sufficient oxygen to support body tissue metabolism, and carbon dioxide is not eliminated adequately through the lungs. The principal cause of hypoventilatory respiratory failure is COPD, the clinical course of which commonly includes exacerbations, usually caused by infections, trauma, or the inhalation of noxious fumes. Other causes of respiratory failure include interstitial lung disease, neuromuscular and chest wall dysfunction, depressed central ventilatory drive, carbon monoxide inhalation, and adult respiratory distress syndrome. Several studies report poor nutritional status in patients with respiratory failure.

As a result of reduced nutrient intake, body energy stores are depleted. The respiratory muscles, (diaphragmatic, intercostal, and accessory), like other skeletal muscles, are cannibalized to meet energy needs. Because work of the muscles stimulates protein synthesis and retards degradation, patients on prolonged mechanical ventilation, whose respiratory muscles move only passively, experience more atrophy than other patients. The decreased levels of energy-rich compounds in muscles, characteristic of malnutrition, are of special significance for patients with COPD and respiratory failure.

The symptoms of respiratory disease and malnutrition have a direct effect on the diaphragmatic muscle. Autopsy studies have shown that the weight of the diaphragm in persons with emphysema is decreased, and the decrease is proportionally greater than the reduction in total body weight. In addition to decreasing muscle mass, malnutrition causes a decrease in contractility of the diaphragm. Carbon dioxide retention also decreases the contractility and endurance time of the human diaphragm. Diaphragmatic weakness can contribute to respiratory failure.

Nutrition can affect central nervous system control of respiration. As opposed to normal individuals, in whom the drive to breathe is an increase in $PaO_2$, the main ventilatory drive in patients with COPD and respiratory failure is hypoxia. Therefore, maintenance of hypoxic drive in these patients is important.

The relationship between nutrition and the immune system is well recognized. Poor nutritional status results in decreased resistance to infection. Malnourished individuals without chronic lung disease are particularly susceptible to pulmonary infection, which often is the immediate cause of death. Bacterial clearing from the lung is depressed by hypoxia and malnutrition.

Maintenance of the immune system is especially important for patients with COPD, since infection in the tracheobronchial tree is a common cause of respiratory failure in these patients. In many patients with COPD, a tracheostomy is performed as an alternative to repeated nasotracheal intubations. Colonization of the tracheobronchial tree with gram-negative enteric bacteria may occur subsequently.

The high prevalence of malnutrition among patients with advanced COPD and its correlation with anatomical and functional abnormalities, as well as mortality, suggest that nutritional care should be a part of therapy. There is increasing evidence that nutrition intervention can reverse the biochemical, anatomical, and functional abnormalities that have been described.

Marked weight loss has long been observed in patients with COPD. Insufficient caloric intake alone does not explain the observed weight losses. Even when patients with COPD have intakes equal to or greater than those of healthy, well-nourished individuals, weight loss and subnormal nutrition parameters are common. Malabsorption has been excluded as the primary cause of weight loss in these patients. These findings suggest that, in addition to decreased caloric intake, patients with COPD have enhanced caloric requirements, presumably due to the increased work of breathing.

It has been reported that weight loss and erosion of lean body mass tend to occur during acute exacerbations of the disease. Weight loss of 10% or more preceding heart failure has been reported in patients with COPD and hypercapnia. Also, mortality was significantly greater among the patients who lost weight. Nutritional repletion in patients with COPD results has been reported to result in improved respiratory function and quality of life.

The liquid nutritional product for enteral feeding of the present invention has been formulated to at least reduce the severity of the above described pulmonary related problems which are associated with nutrition.

DISCUSSION OF THE PRIOR ART

Published European Patent Application 0 395 865 relates to an enteral diet for patients with pulmonary disease. There is no teaching or suggestion in this publication that the oil blend contained in this diet should provide both Eicosapentaenoic acid (20:5n3) and Docosahexaenoic acid (22:6n3) as in the nutritional product of the present invention.

PULMOCARE ® is a nutritional product which is distributed commercially by Ross Laboratories, Columbus, Ohio, a Division of Abbott Laboratories, U.S.A. PULMOCARE ® is a high fat, law carbohydrate enteral formula, designed for pulmonary patients, and is discussed in the detailed description of the present invention.

NUTRIVENT TM is an enteral nutritional formulation distributed by Clintec Nutrition Company, Deerfield, Ill., U.S.A. NUTRIVENT TM is designed to offer pulmonary benefits, and is discussed in the detailed description of the present invention.

U.S. Pat. No. 5,059,622 discloses the importance of Eicosapentaenoic acid (EPA) and Gamma-Linolenic acid (GLA) in the diet. However, this patent teaches that the ratio of EPA to GLA which is employed in the nutritional product of the present invention is not desirable for the purpose of reducing blood pressure levels in hypertensive persons. That is to say, U.S. Pat. No. 5,509,622 teaches away from the nutritional product of the present invention.

"Effects of a Fish Oil Diet on Pigs' Cardiopulmonary Response to Bacterimia", M. J. Murray et al., *JOURNAL OF PARENTERAL AND ENTERAL NUTRITION*, Vol. 15, No. 2, (1991), pages 152-158 relates to the establishment of the acute lung injury model using pigs which is elaborated upon in the detailed description of the present invention.

BRIEF DESCRIPTION OF THE DRAWINGS

To acquaint persons skilled in the art with the principles of the invention, a presently preferred embodiment illustrative of the best mode now contemplated for the practice of the invention is described herein making reference to the attached drawings forming a part of the specification and in which drawings.

DETAILED DESCRIPTION OF THE INVENTION

Acute respiratory distress syndrome (ARDS, also known as adult respiratory distress syndrome) is a descriptive term that has been applied to many acute, diffuse infiltrative lung lesions of diverse etiologies. As used herein "acute respiratory distress syndrome" is understood to refer to a particular disease syndrome regardless of patient age. The term was chosen because of several clinical and pathologic similarities between acute illnesses in adults and the neonatal respiratory distress syndrome. Despite the large number of causes of respiratory distress, the clinical characteristics, respiratory pathophysiologic derangement and current techniques for management of these acute abnormalities are very similar.

Patients with chronic obstructive pulmonary disease (COPD) and ARDS suffer from carbon dioxide retention and oxygen depletion in the blood, the goal of therapy is to decrease the blood level of carbon dioxide and to increase the blood level of oxygen. Administration of a diet with an increased proportion of fat calories and decreased carbohydrate calories can decrease carbon dioxide production and respiratory quotient (RQ), thus diminishing ventilatory requirements. This end result is desirable both for the patient with COPD, for whom hypercapnia may lead to respiratory failure, and for the patient with respiratory failure who must be weaned from mechanical ventilation. There are published reports that increases in carbon dioxide production and ventilatory requirements resulting from high carbohydrate loads have been demonstrated in both normal subjects and in patients with airway disease.

Although it is important to provide sufficient protein for anabolism, the overfeeding of protein should be avoided. Protein intake has little effect on carbon dioxide production but has been demonstrated to augment the ventilatory drive mechanism. High-protein diets will stimulate ventilatory drive and minute ventilation in normal individuals. An increase in respiratory drive can be beneficial for patients able to respond to the stimulus. However, for patients unable to increase minute ventilation, the stimulus can increase the work of breathing and cause dyspnea.

Patients with acute respiratory failure and COPD often require fluid restriction and diuresis. Fluid restriction and the use of diuretics usually lower pulmonary vascular pressure and decrease extravascular lung water. However, dehydration from aggressive diuresis will complicate clearance of viscous pulmonary secretions, eg, in patients with pneumonia or asthma.

ARDS are usually associated with pulmonary edema, destruction of lung tissue, ventilatory failure, and malnutrition. Pulmonary edema is the direct result of injury to the alveolocapillary membrane via direct chemical injury from inhaled toxic gases or indirectly through activation and aggregation of formed elements of the blood within pulmonary capillaries. Although platelet aggregation occurs, the major offenders appear to be the neutrophilic leukocytes that adhere to endothelial surfaces. These leukocytes undergo a respiratory burst to inflict oxidant injury and release mediators of inflammation such as leukotrienes ($LTB_4$), thromboxanes ($TXB_2$) and prostaglandins ($PGI_2$, $PGE_2$, $PGF_2$). This injury to alveolocapillary membranes results in leakage of liquid, macromolecules and cellular components from the blood vessels into the interstitial space and alveoli.

Substrate metabolism plays an important role in governing physiologic responses within the lung. Clinical research has shown effects on pulmonary function based on carbohydrate and lipid utilization. $CO_2$ production increases during carbohydrate metabolism compared with fat metabolism. Since the lung must increase ventilation to eliminate this $CO_2$, excess carbohydrates increasing $CO_2$ production and work of breathing would be contraindicated in patients with ventilatory insufficiency.

Figure 1:
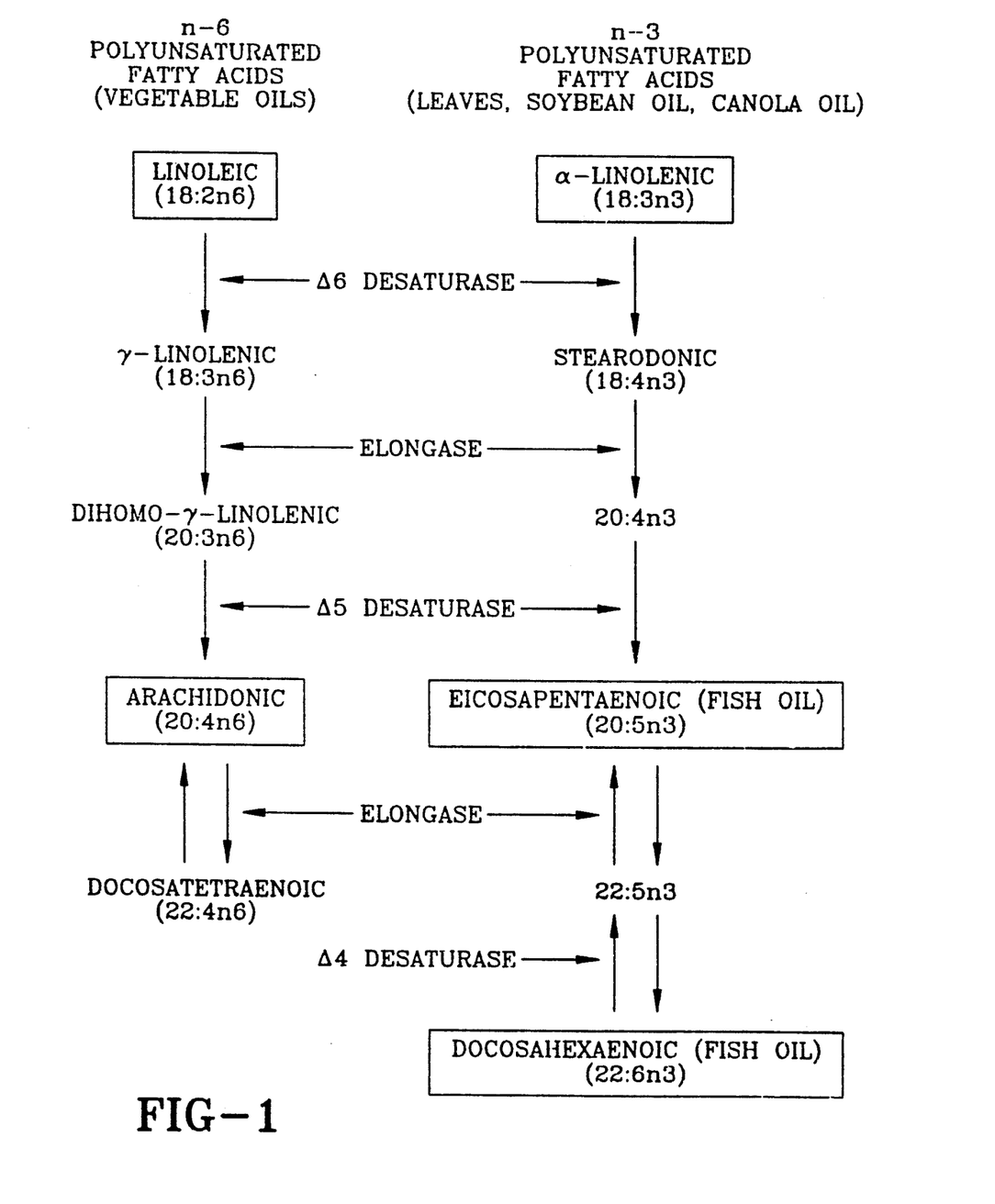
FIG. 1 is a chart of a pathway showing elongation and desaturation of the two major families of dietary polyunsaturated fatty acids.
Figure 2:
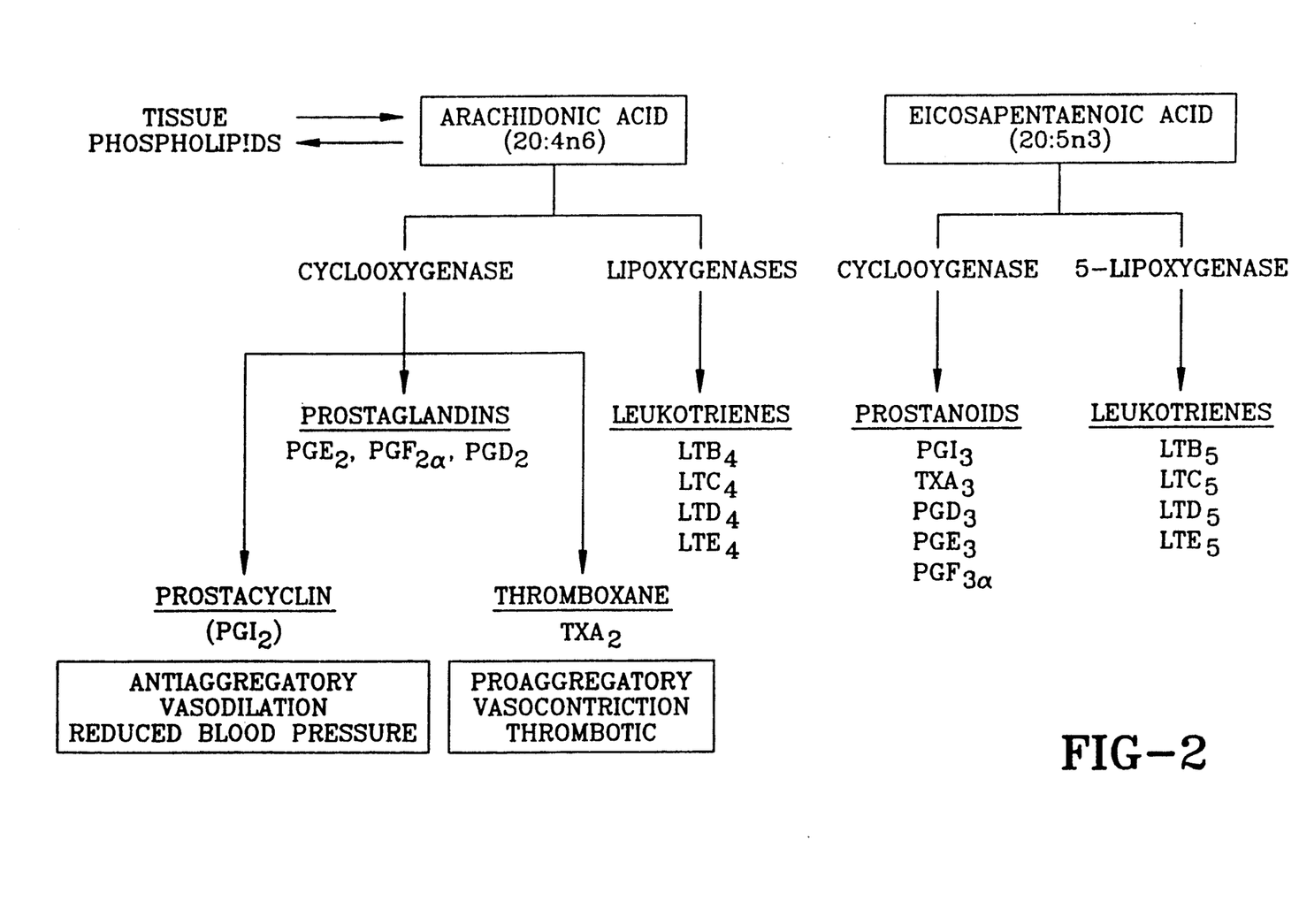
FIG. 2 is a chart outlining the conversion of arachidonic acid into the 2-series eicosanoids and eicosapentaenoic acid into the 3-series eicosanoids.

The use of diets containing high levels of fat in patients with respiratory distress has led to increased interest in understanding the role of fatty acids in lung physiology. It has been shown that the lung plays a major regulative role in prostaglandin metabolism. With reference to FIG. 1, biochemical pathways governing the production of prostaglandins and leukotrienes are controlled by ratios of the precursor fatty acids and linoleic (n-6 family) and linolenic (n-3 family) acid. Dietary linoleic acid (18:2n6), which is abundant in vegetable seed oils (i.e. corn, soybean and safflower oils), is converted to arachidonic acid (20:4n6) which serves as the major precursor of eicosanoids. With reference to FIG. 2, the 2-series prostanoids, prostaglandin $E_2$ ($PGE_2$), thromboxane $B_2$ ($TXB_2$) and prostacyclin ($PGI_2$) are all synthesized from the endoperoxide intermediates generated from arachidonic acid by cyclooxygenase which occurs in most animal tissues. The relative quantities of different prostaglandins synthesized are greatly affected by the availability of arachidonic acid from tissue phospholipids. Thus, prostaglandin production is sensitive to dietary manipulation and diet composition. Arachidonic acid is also converted into the 4-series leukotrienes (ie: $LTB_4$), via the lipoxygenase pathway shown in FIG. 2. The leukotrienes are also bioactive modulators, being involved in pulmonary, macrophage and immune functions, chemotaxis and inflammatory responses.

Figure 3:
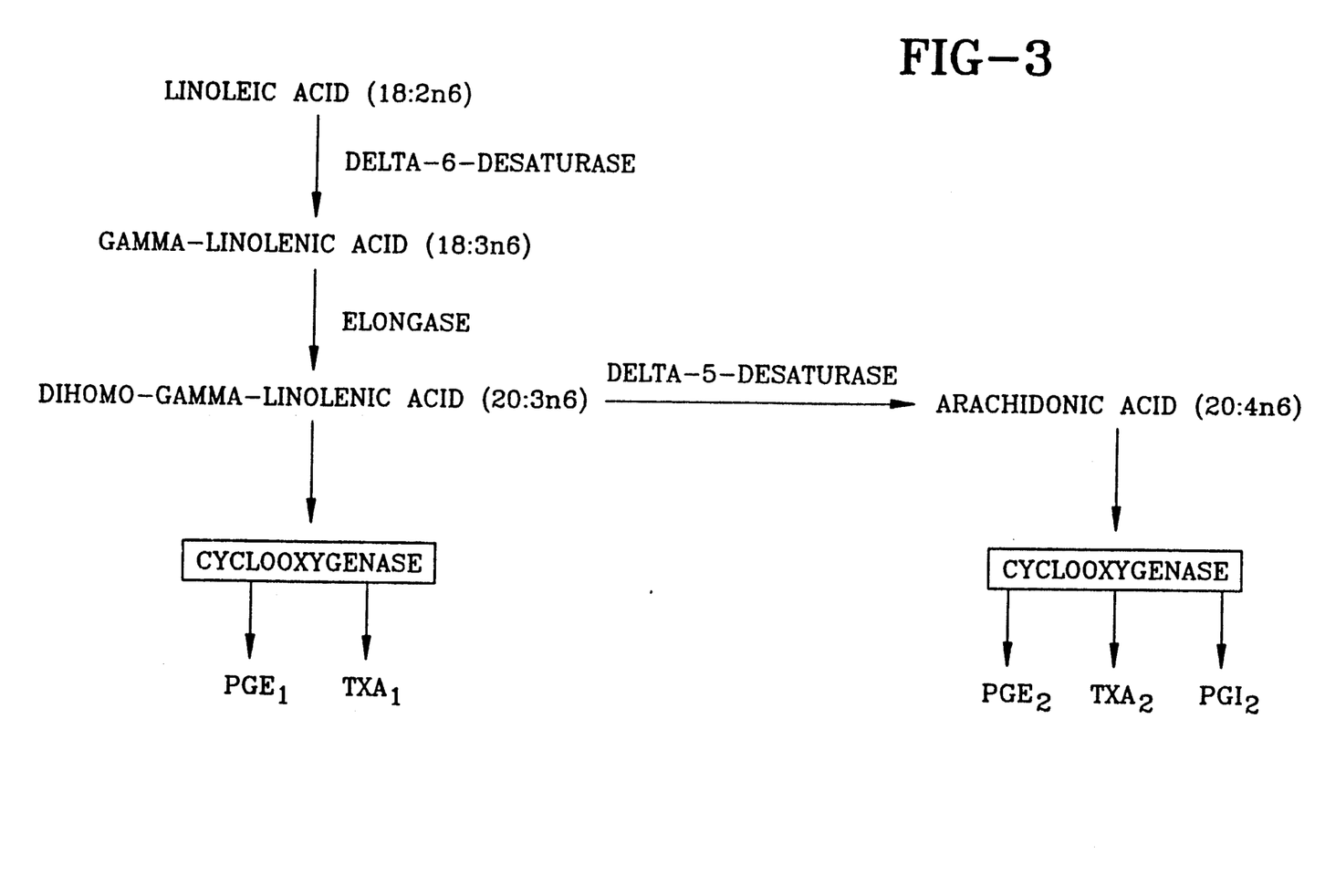
FIG. 3 is a chart showing the metabolic pathway of linoleic acid with series 1 and 2 prostaglandins.

Less attention has been paid to certain plant seed oils, notably those extracted from seeds of borage plants, which contain relatively large amounts of gamma-linolenic acid (GLA)(18:3n6). As illustrated in FIG. 3, GLA is converted to dihomo-gammalinolenic acid (DGLA) (20:3n6), the fatty acid precursor of the monenoic prostaglandins (i.e., $PGE_1$). DGLA can also compete with arachidonate for oxidative enzymes, thereby reducing production of arachidonate-derived cyclooxygenase products. In addition, DGLA cannot be converted to an LTB compound. Therefore, DGLA should have antiinflammatory actions due to its capacity to reduce synthesis of oxygenation products of arachidonic acid, which are mediators of inflammation.

GLA dietary enrichment does suppress acute and chronic inflammation as well as joint tissue injury in several experimental animal models. There are published reports that animals treated with borage seed oils, cells from inflammatory exudate are enriched in GLA and DGLA, exudate $PGE_2$ and $LTB_4$ concentrations are reduced and leukocyte effector functions (chemotaxis, lysosomal enzyme release) are suppressed. Thus, the n-6 FA GLA may have biologic effects analogous to those of the more extensively of studies n-3 fatty acids.

TABLE 1

| PRODUCTS | ACTIONS |
|---|---|
| Cyclooxygenase | |
| $PGD_2$ | Bronchoconstriction |
| $PGE_2$ | Bronchial relaxation, systemic vasodilation |
| $PGF_{2\alpha}$ | Bronchoconstriction, pulmonary vasocontricition |
| $PGI_2$ | Pulmonary and systemic vasodilation, inhibition of platelet aggregation, mild bronchial relaxation |
| Lipoxygenase | |
| $LTB_4$ | Chemotaxis, aggregation and secretion of neutrophils, pulmonary edema |
| $LTC_4$, $LTD_4$ | Bronchoconstriction, pulmonary vasoconstriction, pulmonary edema |
| Lipoxins | Superoxide anion release by neutrophils |

The prostaglandins and leukotrienes have potent effects on bronchial and vascular smooth muscle, secretory function and immune response. Certain arachidonate metabolites are able to induce at least some of the response associated with acute lung injury and other pulmonary disorders. Prostaglandins $PGF_2$ alpha and leukotrienes C, D and $E_4$ are potent bronchonconstrictors. Thromboxane, leukotriene $B_4$, and C, D and $E_4$ are powerful proinflammatory agents. $PGE_2$ and prostacyclin, are bronchodilators and antiinflammatory. Dietary alteration or supplementation with n-3 fatty acids (soybean oil (linolenic acid), dietary seafood) can compete with and alter the production of the proinflammatory prostaglandins and leukotrienes produced from n-6 fatty acids. The n-3 polyunsaturated fatty acids (EPA and DHA) of fish oils compete with arachidonic acid in several ways; they inhibit delta-6 desaturase activity and thereby reduce the conversion of dietary linoleic acid to arachidonic acid; and EPA and DHA competitively displace arachidonic acid from tissue phospholipid pools, thereby reducing the availability of arachidonic acid for eicosanoid production (2-series prostaglandins, 4-series leukotrienes). When linolenic acid, EPA and DHA are substituted for linoleic acid, the resulting prostaglandins and leukotrienes are chemically different from those derived from linoleic acid. With reference to FIG. 2, linolenate derived prostaglandins are designated by the subscript 3 and leukotrienes by the subscript 5. The slight difference in structure of linoleic and linolenic acid metabolites affects their role in inflammation. Thromboxanes $A_3$ and $B_3$ are physiologically inactive and leukotriene $B_5$ is markedly less chemotactic than its arachidonic acid counterpart $B_4$. However, $PGE_3$ appears to be similar in antiinflammatory and bronchodilatory activity to $PGE_2$, and prostacyclin $PGI_3$ is equipotent to $PGI_2$. The net effect of substituting n-3 FA for n-6 is a change in the hemostatic balance to strongly favor an antiinflammatory vasodilatory state with less platelet aggregation.

It has been discovered that nutritional intervention through the administration of the nutritional product of the present invention containing n-3 and GLA fatty acids may play a key role in the management of respiratory failure. The interaction between cyclooxygenase and lipoxygenase eicosanoid pathways in regulating the action and localization of neutrophils and in stimulating them to product oxidant and proteolytic substances makes these mediators of prime consideration as effectors of COPD and ARDS.

The rationale for increasing the amount of GLA and EPA in the diet comes from the observations that these fatty acids alter eicosanoid metabolism. The total amounts of eicosanoids released in response to stress are decreased by these two fatty acids, and the type of eicosanoid released is also changed. With reference to FIG. 3, GLA serves as a precursor for monoenoic eicosanoids and EPA for trienoic eiconsanoids. Most importantly, EPA has been reported to improve pulmonary function in animals with pulmonary disease, and GLA inhibits intravascular thrombosis.

Eucaloric diets with a high percentage of fat have been reported to have beneficial effects in patients with pulmonary disease. The decrease in carbon dioxide production secondary to the low RQ of fat decrease the minute ventilation necessary to maintain "normal" $PaCO_2$, thereby decreasing the work of breathing. The currently available commercial products contain high amounts of n-6 fatty acids (FA), e.g., linoleic acid, which serve as precursors for a group of compounds, the dienoic eicosanoids (e.g., thromboxane $A_2$) which have deleterious effects on pulmonary function.

The ideal amount of dietary fats given to critically ill patients is controversial. Originally, in patients on total parenteral nutrition, fats were periodically (once or twice a week) infused to avoid the sequelae of essential fatty acids deficiency. As problems with carbohydrate as the only source of nonprotein calories developed (hepatic dysfunction), fat was given on a daily basis. However, since intravenous fat emulsions (IVFE) were formulated to supply essential fatty acids, they contain 50-60% LA, a precursor of arachidonic acid (AA; 20:4n-6). IVFE have been associated with pulmonary dysfunction, thought secondary to the metabolites of AA, the dienoic eicosanoids.

There is some basis then for decreasing the amount of fat used in the diet of patients with pre-existing pulmonary dysfunction. The answer is more complex, however, in that while the pharmacologic effects of n-6 fatty acids may be detrimental, there are other beneficial effects of dietary fat on carbon dioxide production. The RQ is defined as: $RQ = VCO_2 / VO_2$ where $VCO_2$ and $VO_2$ are the carbon dioxide production and oxygen consumption in ml per min. The RQ is 0.7 for fat and 1.0 for carbohydrate. This implies that while the oxidation of lipids consumes equal amount of oxygen as compared to carbohydrate, the carbon dioxide production is less for lipids than for carbohydrate. For a patient with pulmonary insufficiency, the decreased $VCO_2$ may be the difference being ventilator dependent versus independent, dyspneic versus comfortable. For ventilator dependent patients and patients with underlying pulmonary insufficiency, there are compelling reasons then to increase the amount of fat in the diet.

Importantly, these conflicting viewpoints can be reconciled perhaps by using an increased amount of dietary fat, but with a lower amount of linoleic acid.

Elongation of the carbon chain is readily achieved, whereas desaturation is a rate-limiting step which is further inhibited in stress states. By supplying GLA, the amount of DGLA is increased without increasing the amount of AA. DGLA, AA and EPA are all long-chain, polyunsaturated fatty acids which vary in the degree of desaturation (EPA>AA>DGLA) and the position of double-bond closest to the methyl end of the molecule (n-3 for EPA, n-6 for DGLA and AA). All three can be stored at the sn-2 position of phospholipids within the cell membrane and released by phospholipases given an appropriate stimulus. Of particular importance is that the cyclooxygenase enzyme may utilize 20 carbon fatty acids with either the n-3 or n-6 configuration as substrates with the respective end products (monoenoic, dienoic, trienoic) proportional to the amount of fatty acids precursor available. Examination of the biologic activity of the respective metabolites suggests, however, that there are marked differences—monoenoic prostaglandins have beneficial pulmonary effects, and trienoic eicosanoids maintain vasodilator function with minimal vasoconstrictor and platelet aggregatory function. Of more importance is the observation that independent of the alterations in types of eicosanoids produced, GLA and n-3 fatty acids decrease the total amount of eicosanoids released with beneficial effects on physiologic (pulmonary) function.

EXPERIMENT

An experiment was designed to test the hypothesis that acute lung injury could be attenuated by altering the eicosanoid precursor pool via diets enriched with GLA and/or EPA. The objectives of this experiment were: (a) to identify the physiologic effects of enteral formulas made from oils which contain high amounts of n-3 fatty acids or the n-6 fatty acid GLA; and (b) to examine the potential salutary or deleterious effects of these oils in an animal model of acute lung injury.

Castrated male pigs (sus scrofa) weighing 20-25 kg were divided into 3 groups of 11 pigs. Each animal received 175 k cal/kg/day of an enteral solution from a specially made liquid feeding device. These diets were eucaloric, isonitrogenous with equivalent amounts of fat. The only difference was in the fatty acids composition.

The control group was fed PULMOCARE ® which is a nutritional product distributed commercially by Ross Laboratories, Columbus, Ohio, a Division of Abbott Laboratories, U.S.A. PULMOCARE ® is a high-fat, low carbohydrate enteral formula, designed to reduce carbon dioxide production, thereby minimizing $CO_2$ retention resulting from chronic obstructive pulmonary disease or acute respiratory failure. A second group of pigs were fed a diet which was identical to PULMOCARE ®, with the exception that it had a lipid blend containing EPA from fish oil. A third group of pigs was fed a diet which was identical to PULMOCARE ® with the exception that it had a lipid blend which contained both EPA from fish oil and GLA from borage oil. The formulations of the various lipid blends are presented in Table 2 wherein blend A is that in commercially available PULMOCARE ®, blend B provides EPA and blend C provides both EPA and GLA. As used herein and in the claims the terms "oil blend" and "lipid blend" are understood to be synonomous.

TABLE 2

CONTENTS OF LIPID BLENDS

| OIL SOURCE | % OF LIPID BLEND. BY WEIGHT | | |
|---|---|---|---|
| | BLEND A | BLEND B | BLEND C |
| Canola | — | 25.80 | 31.80 |
| Soybean | — | 26.00 | — |
| Medium Chain Triglycerides | — | 25.00 | 25.00 |
| Corn | 96.80 | — | — |
| Fish | — | 20.00 | 20.00 |
| Soy Lecithin | 3.20 | 3.20 | 3.20 |
| Borage | — | — | 20.00 |

The pigs received these diets for 8 days. All pigs had catheters placed in the external jugular vein for withdrawal of blood following the ingestion of the various diets. These catheters were placed under anesthesia. Ketamine (20 mg/kg was given intramuscularly, i.m.) for induction, and the animal was allowed to breath 1.0% halothane in a 60% oxygen/air mixture via a mask for maintenance of anesthesia. Indwelling i.v. lines were tunnelled under the skin, and both the exit and the cutdown sites were infiltrated with bupivacaine (0.75%) and epinephrine (1/200,000) to minimize discomfort. After recovery, the animal was placed in its pen and given free access to food and water, and typically the animals began to eat within 4 to 6 hours. The animals were not medicated postoperatively with morphine sulphate.

On the afternoon of the 8th day, the pigs were anesthetized and cannulae were placed in the femoral vein and artery (as described above for the jugular vein).

On the following day, the pigs were placed unanesthetized in harnesses, approximately 2.5 mg/kg pentobarbital given i.v..

The animals were allowed to recover from the procedure for 1 hour, and baseline measures were obtained including systemic, pulmonary, right atrial and pulmonary capillary wedge pressures, cardiac output in triplicate.

The pigs were randomized into two subgroups; an endotoxin group and a non-endotoxin group. Animals randomized to the endotoxin group received a 0.1 mg/kg bolus of *E. coli* endotoxin followed by a continuous infusion of endotoxin delivered at 0.075 mg/kg/hr×4 hr. Animals randomized to the non-endotoxin group received a bolus of saline followed by a continuous saline infusion×4 hr. Hemodynamic and pulmonary function studies were repeated at 20 minutes, 1, 2, and 4 hours.

Figure 4:
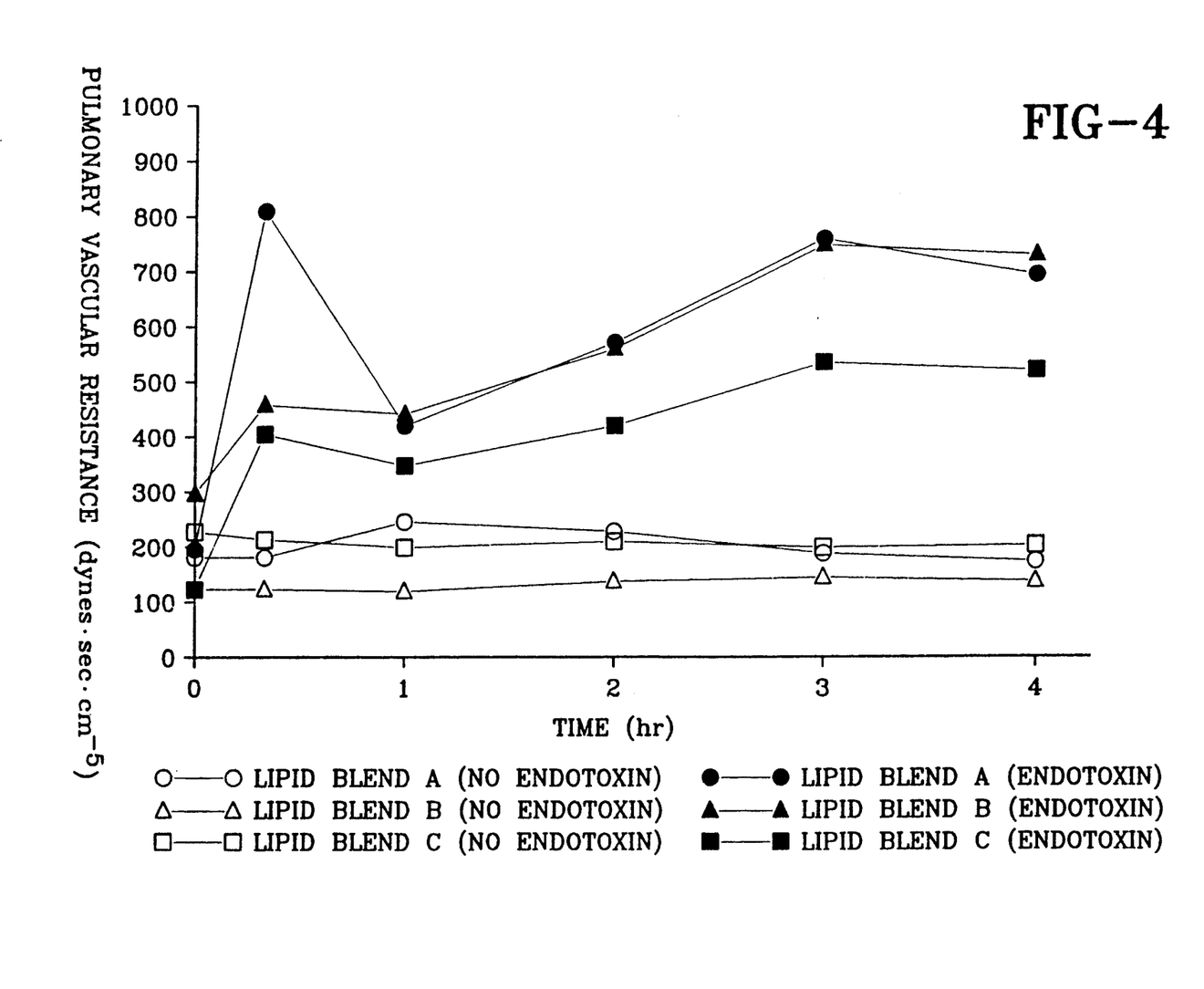
FIG. 4 is a graph presenting the pulmonary vascular resistance of pigs fed a variety of diets.

As used herein pulmonary vascular resistance (PVR) is understood to be the mean pulmonary arterial pressure minus mean left atrial pressure divided by the pulmonary blood flow (cardiac output). PVR is determined by the physical properties of the pulmonary arteries, capillaries and veins, extravascular pressures, and the vascular tone (i.e. vasoconstriction and vasodilation). With reference to FIG. 4 there is shown a graph of PVR as a function of time for pigs fed the three diets. The control pigs were not infused with endotoxin. PVR was substantially constant during the 4 hour experimental period in control pigs fed each of the three diets. Following endotoxin infusion, PVR increased markedly at 20 minutes (Early Phase Response) in the group of pigs fed diet A (PULMOCARE ®). At one hour PVR had decreased but remained higher than that observed at O-time or in the control group fed diet A. PVR steadily increased over the next 2 hours and appeared to stabilize between the third and fourth hour (Late Phase Response). The pigs fed diet B did not demonstrate the Early Phase Response to endotoxin infusion, but the Late Phase Response was substantially identical to that observed in the group fed diet B. Feeding pigs diet C also abolished the Early Phase Response to endotoxin infusion, but appeared to attenuate the late phase response.

Figure 5:
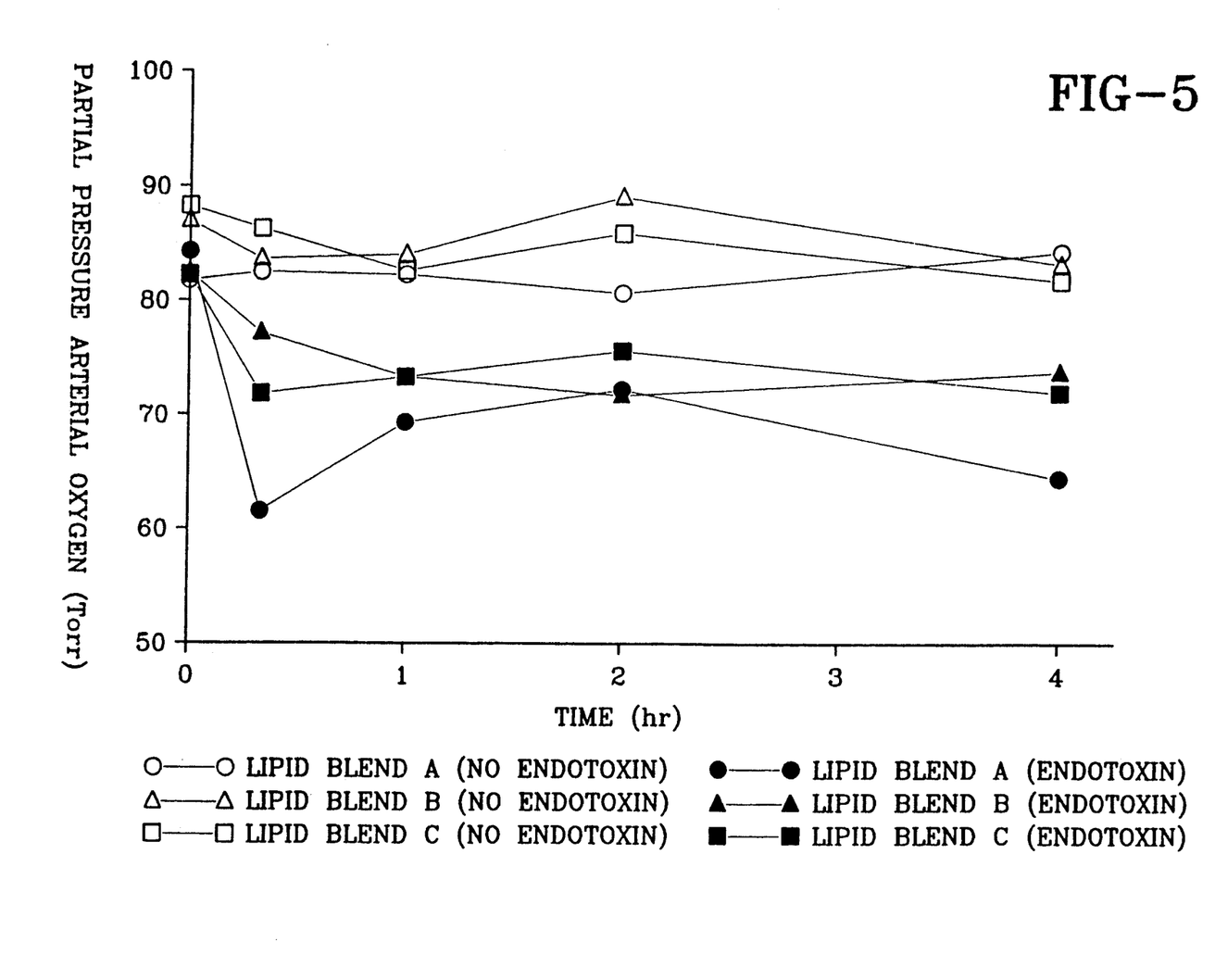
FIG. 5 is a graph presenting the pulmonary arterial oxygen tension of pigs fed a variety of diets.

As used herein partial pressure of arterial oxygen ($PaO_2$) is understood to be a measure of the pressure of oxygen in arterial blood. Oxygen is carried in the blood both dissolved in the plasma and bound to hemoglobin within red blood cells. With reference to FIG. 5 there is shown a graph of $PaO_2$ as a function of time for pigs fed the three diets. The control pigs were not infused with endotoxin. PaO$_2$ was substantially constant during the 4 hour experimental period in control pigs fed each of the three diets. While PaO$_2$ decreased following endotoxin infusion of pigs fed diets A, B and C, the drop in PaO$_2$ was less in those pigs fed diets B and C.

Figure 6:
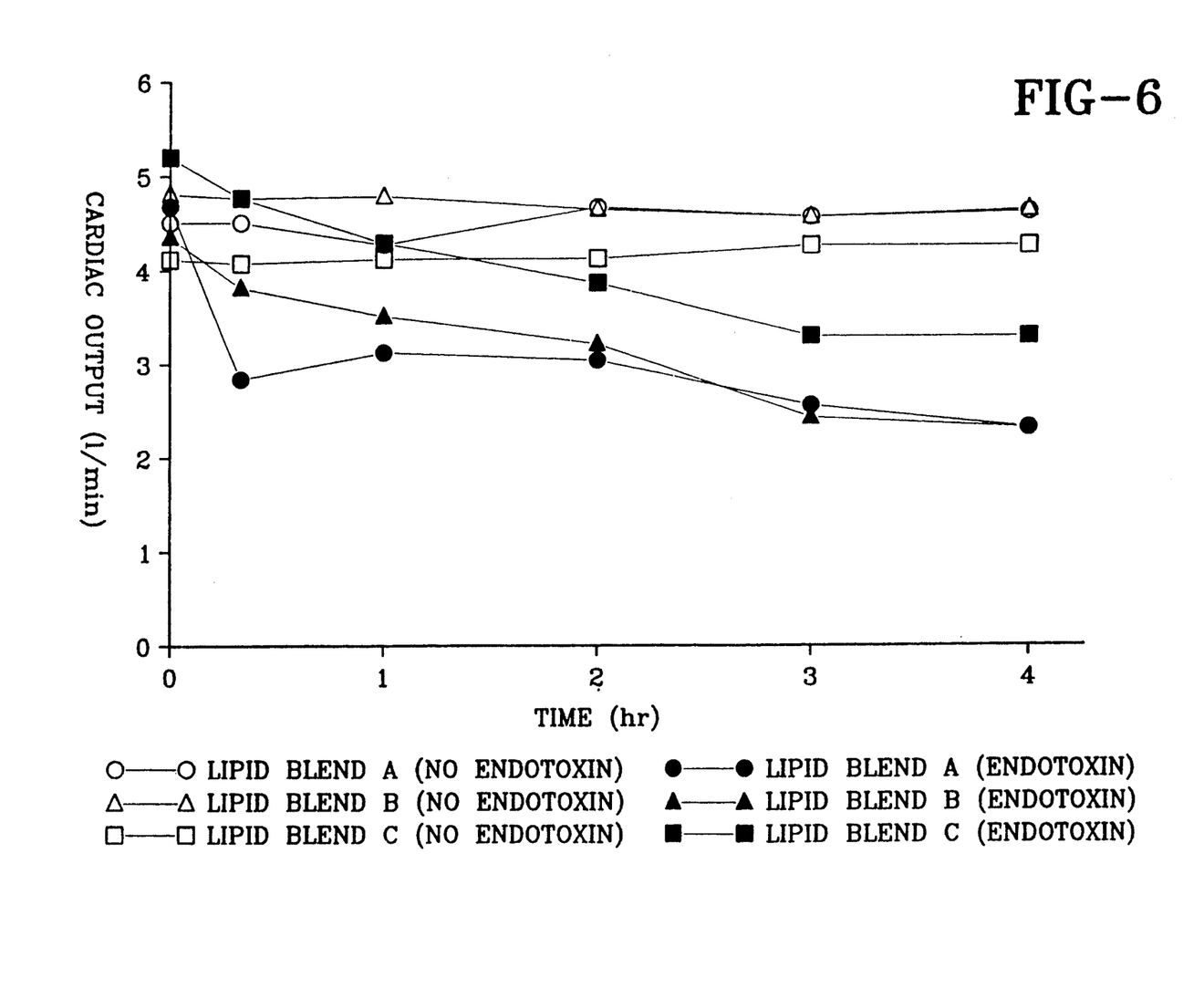
FIG. 6 is a graph presenting the cardiac output of pigs fed a variety of diets.

As used herein cardiac output is understood to be the rate of blood flow from the heart into the arteries. With reference to FIG. 6 there is shown a graph of cardiac output as a function of time for pigs fed the three diets. The control pigs were not infusued with endotoxin. Cardiac output was substantially constant during the 4 hour experimental period in control pigs fed each of the three diets. Cardiac output decreased at 20 minutes in pigs fed diet A and infused with endotoxin, and remained at a decreased level during the remainder of the 4 hour experimental period. A similar decrease in cardiac output was observed in the pigs fed diet B and infused with endotoxin, but the rate of decline in cardiac output was slower in this group of pigs than in the pigs that had been fed diet A. Cardiac output also decreased in the pigs fed diet C and infused with endotoxin, however the magnitude of the decrease in cardiac output was less than that observed in the pigs fed diets A and B.

In summary, diets B and C attenuated the fall in PaO$_2$ and rise in PVR following endotoxin challenge. Furthermore, diet C maintained cardiac output closer to baseline and superior to the other diets. It was therefore concluded that a diet containing eicosapentaenoic acid (EPA) or a combination of EPA and gamma-linolenic acid (GLA) attenuate pulmonary dysfunction following endotoxemia.

The characteristics of lipid blends A, B and C are presented in Table 3. The fatty acid profiles of lipid blends A, B and C are presented in Table 4. The values in Table 4 were calculated using a highly sophisticated computer program having a very high degree of accuracy when compared to an actual laboratory analysis of a lipid blend. Also presented in Tables 3 and 4 are the characteristics and fatty acid profile of a lipid blend D which comprises by weight 43% canola oil, 40% medium chain triglycerides, 13% corn oil and 4% soy lecithin. Lipid blend D is used in a commercially available product sold under the name NUTRIVENT ™ which is distributed by Clintec Nutrition Company, Deefield, Ill., U.S.A. NUTRIVENT ™ is a formulation that is designed to offer pulmonary benefits.

TABLE 3

| LIPID BLEND CHARACTERISTICS | | | | |
|---|---|---|---|---|
| CHARACTERISTIC | BLEND A | BLEND B | BLEND C | BLEND D |
| % n-3 fatty acids | 1.38 | 13.25 | 12.06 | 4.21 |
| % n-6 fatty acids | 59.42 | 21.61 | 20.73 | 18.94 |
| % n-9 fatty acids | 25.16 | 25.61 | 27.77 | 30.94 |
| % saturated fatty acids | 13.62 | 34.78 | 34.40 | 45.44 |
| % monounsaturated fatty acids | 25.35 | 27.42 | 29.60 | 31.09 |
| % polyunsaturated fatty acids | 60.80 | 34.86 | 32.79 | 23.15 |
| n-6/n-3 ratio | 43.18 | 1.63 | 1.72 | 4.50 |
| 18:2n6/18:3n3 ratio | 43.18 | 4.80 | 4.96 | 4.50 |
| 18:3n3, % total energy | 0.76 | 2.47 | 1.78 | 2.32 |
| 18:2n6, % total energy | 32.80 | 11.83 | 8.80 | 10.45 |
| 18:1n9, % total energy | 13.89 | 13.25 | 13.51 | 16.67 |
| PUFAs, % total calories | 33.56 | 19.24 | 18.10 | 12.78 |
| SAT FAs, % total calories | 7.52 | 19.20 | 18.99 | 25.08 |

TABLE 4

| | % OF TOTAL, BY WEIGHT | | | |
|---|---|---|---|---|
| FATTY ACID | BLEND A | BLEND B | BLEND C | BLEND D |
| Caproic (6:0) | 0.00 | 0.03 | 0.03 | 0.04 |
| Caprylic (8:0) | 0.00 | 16.00 | 16.00 | 25.60 |
| Capric (10:0) | 0.00 | 8.88 | 8.88 | 14.20 |
| Lauric (12:0) | 0.00 | 0.10 | 0.10 | 0.16 |
| Myristic (14:0) | 0.10 | 1.23 | 1.24 | 0.06 |
| Palmitic (16:0) | 11.05 | 6.46 | 6.23 | 3.80 |
| Palmitoleic (16:1n7) | 0.19 | 1.81 | 1.83 | 0.16 |
| Stearic (18:0) | 2.09 | 1.91 | 1.68 | 1.22 |
| Oleic (18:1n9) | 25.16 | 24.00 | 24.48 | 30.21 |
| Linoleic (18:2n6) | 59.42 | 21.43 | 15.93 | 18.94 |
| Gamma-linolenic (18:3n6) | 0.00 | 0.00 | 4.58 | 0.00 |
| Alpha-linolenic (18:3n3) | 1.38 | 4.47 | 3.22 | 4.21 |
| Stearidonic (18:4n3) | 0.00 | 0.78 | 0.84 | 0.00 |
| Arachidic (20:0) | 0.39 | 0.18 | 0.26 | 0.35 |
| Eicosenoic (20:1n9) | 0.00 | 0.92 | 1.76 | 0.43 |
| Arachidonic (20:4n6) | 0.00 | 0.17 | 0.17 | 0.00 |
| Eicosapentaenoic (20:5n3) | 0.00 | 5.02 | 5.02 | 0.00 |
| Erucic (22:1n9) | 0.00 | 0.69 | 1.23 | 0.30 |
| Docosapentaenoic (22:5n3) | 0.00 | 0.50 | 0.50 | 0.00 |
| Docosahexaenoic (22:6n3) | 0.00 | 2.49 | 2.49 | 0.00 |
| Nervonic (24:1n9) | 0.00 | 0.00 | 0.30 | 0.00 |
| Others | 0.23 | 2.94 | 3.21 | 0.33 |

The Characteristics set forth in Table 3 for the various lipid blends clearly show that the lipid blends which contain either EPA (Blend B) or a combination of EPA and GLA (Blend C) are preferable over blend A (PULMOCARE ®) and blend D (NUTRIVENT ™) because a chronic imbalance between the essential fatty acid metabolites, gamma-linolenic acid (GLA) dihomo-gammalinolenic acid (DGLA) arachidonic acid and eicosapentaenoic acid (EPA) and their derivatives (1-, 2-, and 3-series prostaglandins) has been proposed to be one contributing factor in the etiology of many serious diseases (infammatory disorders, cardiovascular disorders, menstrual cycle disorders and malignancy). This can be explained by the fact that GLA and EPA are synthesized from linoleic and linolenic acid respectively via the enzyme, delta-6-desaturase (D6D) (see FIG. 1). In animals and humans, this is a rate-limiting step in which under certain dietary and physiological conditions, the amount or activity of D6D and the ability to form GLA and EPA is lessened. The activity of the D6D is rather low in normal subjects but is further decreased by viral infections, stress, aging, cancer, diabetes and alcoholism. In addition, evidence indicates that a high supply of linoleic acid such as in lipid blends A and D (PULMOCARE ® and NUTRIVENT ™) inhibits the activity of D6D and its further desaturation and elongation (see FIG. 1). Therefore the inhibition of delta-6 desaturase and the consequent difficulty in desaturating adequate amounts of dietary linoleic and linolenic acids makes it necessary to provide a dietary supplement of GLA and EPA in the nutritional product of the present invention. GLA is efficiently and quickly elongated to DGLA, the metabolic precursor to series 1 prostaglandins and EPA is the metabolic precursor to the 3-series prostaglandins and 5-series leukotrienes. Therefore, the overall metabolic balance from prostaglandins and leukotrienes can be manipulated with GLA and EPA supplementation.

Furthermore, the characteristics set forth in Table 3 for the various lipid blends clearly show that a lipid blend which contains a combination of EPA and GLA (Blend C) is preferable over a lipid blend which contains only EPA because both of these fatty acids favorably alter eicosanoid metabolism. The total amount of eicosanoids released in response to stress are decreased by these two fatty acids, and the type of eicosanoids released is also changed. GLA serves as a precursor for monoenoic eicosanoids which have beneficial pulmonary effects; EPA serves as a precursor for trienoic eicosanoids which maintain vasodilator function with minimum vasoconstrictor and platelet aggregatory function. Therefore the net effect of combining EPA and GLA is a change in the hemostatic balance to strongly favor an antiinflammatory vasodilatory state with less platelet aggregation that would not be effectively achieved by EPA alone.

In view of the foregoing experimental results and detailed comparisons of various lipid blends it was determined that a liquid nutritional product in accordance with the present invention should contain a lipid blend having a fatty acid profile which has, as a % by weight of total fatty acids, the amounts of certain selected fatty acids set forth in Table 5.

TABLE 5
LEVELS OF SELECTED FATTY ACIDS
(AS % BY WEIGHT OF TOTAL FATTY ACIDS)

| FATTY ACID | PREFERRED RANGE | MOST PREFERRED RANGE | TARGET |
|---|---|---|---|
| Oleic acid (18:1n9) | 20.8–28.2 | 22.1–27.0 | 24.5 |
| Linoleic acid (18:2n6) | 13.5–18.3 | 14.3–17.5 | 15.9 |
| Gamma-Linolenic acid (18:3n6) | 3.9–5.3 | 4.1–5.1 | 4.6 |
| Alpha-Linolenic acid (18:3n3) | 2.7–3.7 | 2.9–3.5 | 3.2 |
| Stearidonic acid (18:4n3) | 0.71–0.97 | 0.76–0.92 | 0.84 |
| Eicosapentaenoic acid (20:5n3) | 4.25–5.75 | 4.5–5.5 | 5.0 |
| Docosahexaenoic acid (22:6n3) | 2.1–2.9 | 2.25–2.75 | 2.5 |

Furthermore, it was determined that a liquid nutritional product in accordance with the present invention should contain a lipid blend in which: the ratio of n-6 to n-3 fatty acids is in the range of about 1.5 to about 3.0, preferably about 1.72; the ratio of Linoleic acid (18:2n6) to Alpha-Linolenic acid (18:3n3) is in the range of about 3.0 to about 10.0, preferably about 4.96; and the ratio of the sum of EPA and DHA to GLA is in the range of about 1.0 to about 10.0, preferably about 1.64.

In view of the foregoing experimental results and detailed comparisons of various lipid blends it was determined that the preferred formulation of an oil blend (lipid blend) employed in the practice of the present invention should be that set forth in Table 6.

TABLE 6
FORMULATION OF PREFERRED OIL BLEND
(AS % OF TOTAL WEIGHT OF OIL BLEND)

| OIL | PREFERRED RANGE | MOST PREFERRED RANGE | TARGET |
|---|---|---|---|
| Canola | 20–50 | 30–50 | 31.8 |
| MCT (preferably from coconut oil) | 5–35 | 20–30 | 25.0 |
| Fish | 5–30 | 15–25 | 20.0 |
| Borage | 5–30 | 15–25 | 20.0 |
| Soy Lecithin | 2.5–6.0 | 2.5–4 | 3.2 |

It was felt that additional benefits can be obtained by including in the nutritional product of the present invention nutrients which exhibit antioxidant activity in a patient with respiratory insufficiency.

An oxygen-free radical contains one or more unpaired electrons, an unpaired electron being one that is alone in an orbital. Because electrons are stable when paired together in orbitals, radicals are more reactive than non-radical species. Radicals can react with other molecules in a number of ways. The interest in the role of free radicals and hydrogen peroxide in human disease has grown rapidly.

It is widely recognized that many critical illnesses may involve oxygen radical pathophysiology. For example, both experimental and clinical investigators have implicated oxyradical injury in the pathogenesis of pulmonary oxygen toxicity, acute respiratory distress syndrome, bronchopulmonary dysplasia, and sepsis syndrome. Oxyradicals can devestate all four major classes of macromolecules composing living matter, and a variety of mechanisms exist for the generation of these toxic species, especially in the critically ill patient.

The hydroxyl radical (HO.) is the most reactive radical species, in that it can attack and damage almost every molecule found in living cells. In fact, the formation of hydroxyl radicals is the major mechanism by which malignant-cells are killed during radiotherapy. Lipid peroxidation is a well characterized biologic damage caused by the hydroxyl radical. It is the highly unsaturated fatty acids which are the most susceptible since the hydroxyl radical preferentially attacks fatty acids with several double bonds.

A decision was made to fortify the nutritional product of the present invention with quantities of selenium and vitamins C, E and beta carotene at levels that meet or exceed the U.S. RDA's for these nutrients because they are reported in the literature as having desirable antioxidant properties in humans. Molybdenum and taurine are also believed to exhibit desirable antioxidant acitivites. It is believed that pulmonary distress of any sort may be aggravated by oxidation of lipids at a cellular level.

Vitamin C is a hydrophillic vitamin with well known antioxidant properties. Beta-carotene is also widely recognized as having the capacity to scavenge free radicals and singlet oxygen. Beta-carotene exhibits good free radical-trapping antioxidant behavior only at partial pressures of oxygen significantly less than 150 torr, the pressures of oxygen in normal air. Such low partial pressures are found in most tissues under physiological conditions. Vitamin E is a mixture of four lipid-soluble tocopherols. Alpha-tocopherol is the most active of the four tocopherols at trapping peroxyl radicals. The vitamin E radical is fairly stable due to delocalization of the unpaired electron. The functional interrelation between vitamin E and other micronutrients, notably selenium and vitamin C, has long been recognized.

For example, several symptoms of vitamin E deficiency are preventable by selenium, and the severity of these symptoms is linked to the nutritional status of selenium. The synergistic effect of vitamin C on vitamin E can be attributed to vitamin C's antioxidant properties or to vitamin C's role in the regeneration of vitamin E. It has long been established that the requirement for vitamin E is related to the amount of polyunsaturated fat in the diet.

A liquid nutritional product for enteral feeding according to a preferred embodiment contains the following nutrients which exhibit antioxidant activities: about 3500 mcg/L to about 6500 mcg/L, more preferably about 4000 mcg/L to about 6000 mcg/L, and most preferably about 5000 mcg/L of beta-carotene; about 150 IU/L to about 450 IU/L, more preferably about 200 IU/L to about 400 IU/L, and most preferably about 300 IU/L of vitamin E; about 450 mg/L to about 850 mg/L, more preferably about 550 mg/L to about 750 mg/L, and most preferably about 650 mg/L of vitamin C; and about 250 mg/L to about 350 mg/L, preferably about 275 mg/L to about 325 mg/L, and most preferably about 300 mg/L of taurine. It is understood that a liquid nutritional product in accordance with the broad aspect of the invention may contain one or more of the nutrients selected from the group consisting of beta-carotene, vitamin E, vitamin C and taurine in the amounts indicated in the preceding sentence.

A liquid nutritional product for enteral feeding in accordance with a preferred embodiment of the present invention has: about 16.0% to about 18.0%, most preferably about 16.7% of the total calories in the product provided by protein; about 25% to about 30.0%, most preferably about 28.1% of the total calories in the product provided by carbohydrate; and about 45.0% to about 56.0%, most preferably about 55.2% of the total calories in the product provided by fat. Put another way, a liquid nutritional product for enteral feeding in accordance with a preferred embodiment of the present invention contains: about 58.5g/L to about 65.8 g/L, most preferably about 61.1 g/L of protein; about 91.5 g/L to about 109.8 g/L, most preferably about 102.8 g/L of carbohydrate; and about 75.0 g/L to about 93.3 g/L, most preferably about 92.0 g/L provided by fat.

The preferred source of fat in the liquid nutritional product is the lipid blend comprising canola oil, medium chain triglycerides, fish oil, borage oil, and soy lecithin which has been described above in detail.

The preferred sources of protein in the liquid nutritional product of the present invention are intact milk and soy protein. The reason that this is the preferred source of protein is they both are high quality proteins with high biological value. However; other suitable sources of protein that may be used in the practice of the present invention include milk and soy protein hydrolysates.

The preferred sources of carbohydrate in the liquid nutritional product of the present invention are hydrolyzed corn starch and sucrose. The reason that these are the preferred sources of carbohydrate is that both simple and complex carbohydrates are provided. However, other suitable sources of carbohydrate that may be used in the practice of the present invention include: oligosaccharides and fiber.

The liquid nutritional product of the present invention is intended primarily to be fed to a patient via a feeding tube in a manner which is well known in the art. However, it is considered to be within the scope of this invention to add a flavoring system to facilitate oral feeding. The nutritional product of the present invention preferrably has a viscosity of not greater than 55 cps, which is consistent with good tube feeding characteristics.

It is believed that the pulmonary function of a mammalian creature having respiratory insufficiency may be improved by enteral feeding of a liquid nutritional product in accordance with the present invention.

The most preferred composition, by weight, of a liquid nutritional product for enteral feeding in accordance with the present invention is set forth in Table 7.

TABLE 7

| PREFERRED PRODUCT COMPOSITION | | |
|---|---|---|
| NUTRITION INFORMATION | Per 8 fl. oz. | Per Liter |
| Calories | 355 | 1500 |
| Protein, g | 14.8 | 61.1 |
| Carbohydrate, g | 25.0 | 102.8 |
| Fat, g | 21.8 | 92.0 |
| Canoloa oil, g | 6.93 | 29.29 |
| MCT oil, g | 5.45 | 23.03 |
| Fish oil, g | 4.36 | 18.42 |
| Borage oil, g | 4.36 | 18.42 |
| Soy lecithin, g | 0.7 | 2.95 |
| Water, mL | 186 | 786 |
| $\beta$-carotene, mcg | 1183 | 5000 |
| Vitamin A, IU | 1250 | 5283 |
| Vitamin D, IU | 100 | 423 |
| *Vitamin E, IU | 71 | 300 |
| **Vitamin K, mcg | 18 | 100–185 |
| Vitamin C, mg | 154 | 650 |
| Folic Acid, mcg | 200 | 845 |
| Thiamine (vitamin $B_1$), mg | 0.75 | 3.17 |
| Riboflavin (vitamin $B_2$), mg | 0.85 | 3.6 |
| Vitamin $B_6$, mg | 1.0 | 4.2 |
| Vitamin $B_{12}$ mcg | 3.0 | 12.7 |
| Niacin, mg | 10 | 42 |
| Chloine, mg | 150 | 634 |
| Biotin, mcg | 150 | 634 |
| Pantothenic acid, mg | 5.0 | 21.1 |
| Sodium, mg | 310 | 1311 |
| Potassium, mg | 410 | 1733 |
| Chloride, mg | 400 | 1691 |
| Calcium, mg | 260 | 1100 |
| Phosphorus, mg | 260 | 1100 |
| Magnesium, mg | 100 | 423 |
| Iodine, mcg | 37.5 | 158 |
| Manganese, mg | 1.25 | 5.28 |
| Copper, mg | 0.50 | 2.11 |
| Zinc, mg | 5.63 | 23.8 |
| Iron, mg | 4.5 | 19.0 |
| Selenium, mcg | 18.0 | 76.0 |
| Chromium, mcg | 25.0 | 106.0 |
| Molybdenum, mcg | 38.0 | 160.3 |
| L-carnitine, mg | 35.5 | 150.0 |
| Taurine, mg | 71 | 300 |

*d-alpha-tocopheryl acetate (all natural form) or dl-alpha tocopherol acetate, or a combination of the two.
**Vitamin K level is dependent upon level of Vitamin K in oils The process of manufacturing the liquid nutritional product for enteral feeding of the present invention begins with the preparation of an acid casein slurry and a carbohydrate/mineral slurry. An oil blend containing the oils, emulsifier, oil soluble vitamins, stabilizer and a portion of the protein is then prepared. A protein in fat slurry is then added to the casein slurry, followed by the carbohydrate slurry. The resulting mixture is homogenized, heat processed, standardized with vitamins, flavored, and terminally sterilized. Table 8 is the Bill of Materials used in the manufacture of 1700 lb. batch of the nutritional product of the present invention.

TABLE 8

BILL OF MATERIALS FOR 1700 LB BATCH

| INGREDIENT | | AMOUNT LBS |
|---|---|---|
| Borage Oil | | 30.60 |
| *Fish Oil | | 30.60 |
| **MCT Oil | | 38.25 |
| **Canola Oil | | 48.65 |
| Mineral premix | | 0.53 |
| Zinc | 0.0439 | |
| Iron | 0.0334 | |
| Manganese | 0.0093 | |
| Cooper | 0.0039 | |
| Selenium | 0.0001 | |
| Chromium | 0.0002 | |
| Molybdeum | 0.0003 | |
| Sucrose (carrier) | Q.S. | |
| Ascorbic Acid | | 2.57 |
| Vitamin D | | 0.0009 |
| Vitamin E | | 0.6 |
| Vitamin A | | 0.0083 |
| Taurine | | 0.52 |
| Carnitine | | 0.278 |
| Water Soluble Vitamin Premix | | 0.23 |
| Niacinamide | 0.0871 | |
| d-Calcium Pantothenate | 0.0564 | |
| Pyridoxine Hydrochloride | 0.0138 | |
| Thiamine Hydrochloride | 0.0144 | |
| Riboflavin | 0.0112 | |
| Folic Acid | 0.0020 | |
| Biotin | 0.0017 | |
| Cyanocabalamin | 0.0004 | |
| Dextrose (carrier) | Q.S. | |
| Corn Syrup Solids | | 74.18 |
| Sucrose | | 86.13 |
| Acid Casein | | 103.97 |
| Carrageenan | | .07 |
| Magnesium Chloride | | 6.25 |
| Potassium Citrate | | 4.57 |
| 45% Potassium Hydroxide | | 0.77 |
| Potassium Phosphate Dibasic | | 1.37 |
| Potassium Iodide | | .0004 |
| Sodium Chloride | | 0.13 |
| Sodium Citrate | | 3.05 |
| Lecithin Centrol CA | | 4.90 |
| Sodium Hydroxide | | 2.15 |
| Choline Chloride | | 1.25 |
| Micronized Triacalcium Phosphate | | 4.83 |
| Natural and Artificial Vanilla | | 1.87 |
| Calcium Caseinate | | 15.03 |
| Beta carotene | | .01 |
| Ingredient Water | | 1239.26 |

*Mochida brand concentrated fish oil is preferred.
**The medium chain triglycerides may be in the form of coconut oil.
***Canola oil is the primary source of Vitamin K in the product.

A protein-in-water slurry is prepared by following a procedure described in U.S. Pat. No. 4,880,912. That is to say, an appropriate amount of water to make a slurry containing 13% total solids is placed into a suitable tank and heated to a temperature of about 150°-170° F. Potassium citrate is then added to the water and held for 1 minute. The pH of the solution is then determined followed by the addition of the acid casein. The required amount of 20% sodium hydroxide solution (prepared in advance) is then added to the slurry. The protein-in-water slurry is then recirculated and held for eight minutes when the pH is once again determined. The pH specification is 6.4 to 7.1. If the pH is below 6.4, additional sodium hydroxide is added. The slurry is held at a temperature of 145°-155° F. with agitation. This temperature is critical.

A carbohydrate and mineral slurry is prepared by placing the appropriate amount of water to make a slurry containing 47% total solids in a suitable tank and heating the water to a temperature of about 110°-145° F. The magnesium chloride, sodium chloride, potassium citrate, sodium citrate, mineral premix, and potassium iodide are then added. The slurry is agitated until a clear green solution is produced. The potassium phosphate dibasic is then added with agitation. While maintaining moderate agitation the corn syrup solids are added. The temperature of the slurry is then increased to about 130° F. and the sucrose and micronized tricalcium phosphate are added with agitation. The carbohydrate mineral slurry is recirculated and maintained at a temperature of 130° to 145° F.

An oil blend is prepared by combining canola oil, borage oil, marine oil, and MCT oil in a blend tank and heating the blend to a temperature of about 130°-140° F. with agitation. The required amount of emulsifier, soy lecithin, is added to the heated oil. The oil soluble vitamins (vitamins A, D, E, and beta carotene) are added individually and their containers are rinsed with a small amount of the hot oil to assure complete transfer. The stabilizer carrageenan is then added, followed by the protein, calcium caseinate. The protein in fat slurry is maintained at a temperature of about 130° F. with agitation until used.

The protein in water slurry, the carbohydrate slurry, and the protein in fat slurry are combined with agitation to yield a blend having 28% solids, by weight. The pH of the blend should be in the range of 6.40-6.70. If an adjustment of pH is needed, 1N KOH or 1N citric acid is added. The temperature of the blend is adjusted to be about 130°-150° F. and agitated for at least 5 minutes. The maximum time that a completed blend may be held is two hours before initiation of processing.

The blend is emulsified, high temperature short time processed (160°-175° F.), then homogenized at 3900-4100/400-600 psig. The processed blend is then cooled to a temperature of about 34°-44° F.

A solution of vitamins is prepared by heating the appropriate amount of ingredient water to make a solution containing 4.6% total solids to a temperature of about 50°-100° F. The water soluble vitamin premix, choline chloride, ascorbic acid, carnitine, taurine and 45% KOH are then added with agitation and the pH is taken. The pH range is 6.0-12.0, if the pH is below 6.0 then additional 45% KOH is added and recorded. The vitamin solution is then added to the blend.

A flavor solution is made by heating the required amount of ingredient water to make a solution containing 11.6% total solids to a temperature of about 50°-100° F. The vanilla flavoring is then added, followed by 10 minutes of agitation. The flavor solution is then added to the blend. The total solids in the complete blend is targeted to be 26%.

The pH of the complete blend is adjusted with 1N KOH, placed in suitable containers such as 8 oz. or 1 liter metal cans and terminally sterilized. Alternatively, the manufacturing process may be adapted to accommodate aseptic packaging of the product in suitable containers. The finished product of that preferred embodiment is a ready-to-serve liquid.

The foregoing detailed description is given for clearness of understanding only, and no unnecessary limitations should be understood therefrom, as aspectsand advantages within the scope of the present invention will be apparent to those skilled in the art.

What is claimed is:

1. A liquid nutritional product for enteral feeding comprising: (a) a source of fat which is a blend of oils which taken in combination, by weight, have a ratio of fatty acids from the group consisting of Linoleic acid (18:2n6), Gamma-Linolenic acid (18:3n6), and Arachidonic acid (20:4n6) to fatty acids from the group consisting of Alpha-Linolenic acid (18:3n3), Stearidonic acid (18:4n3), Eicosapentaenoic acid (20:5n3), Docosapentaenoic acid (22:5n3) and Docosahexaenoic acid (22:6n3) in the range of about 1.5 to about 3.0, a ratio of Linoleic acid (18:2n6) to Alpha-Linolenic acid (18:3n3) in the range of about 3.0 to about 10.0, and a ratio of the sum of Eicosapentaenoic acid (20:5n3) and Docosahexaenoic acid (22:6n3) to Gamma-Linolenic acid (18:3n6) in the range of about 1.0 to about 10.0; and (b) at least one nutrient selected from the group consisting of beta-carotene, vitamin E, vitamin C, taurine and selenium.

2. A liquid nutritional product for enteral feeding comprising a source of fat, about 45% to about 56% of the total calories in the product being provided by fat, the source of fat being a blend of oils which taken in combination, by weight, have a ratio of fatty acids from the group consisting of Linoleic acid (18:2n6), Gamma-Linolenic acid (18:3n6), and Arachidonic acid (20:4n6) to fatty acids from the group consisting of Alpha-Linolenic acid (18:3n3), Stearidonic acid (18:4n3), Eicosapentaenoic acid (20:5n3), Docosapentaenoic acid (22:5n3) and Docosahexaenoic acid (22:6n3) in the range of about 1.5 to about 3.0, a ratio of Linoleic acid (18:2n6) to Alpha-Linolenic acid (18:3n3) in the range of about 3.0 to about 10.0, and a ratio of the sum of Eicosapentaenoic acid (20:5n3) and Docosahexaenoic acid (22:6n3) to Gamma-Linolenic acid (18:3n6) in the range of about 1.0 to about 10.0; and said product further comprising about 3500 mcg/L to about 6500 mcg/L of beta carotene, about 150 IU/L to about 450 IU/L of vitamin E, and about 450 mg/L to about 850 mg/L of vitamin C.

3. A liquid nutritional product for enteral feeding according to claim 2 further comprising about 250 mg/L to about 350 mg/L of taurine.

4. A liquid nutritional product for enteral feeding according to either one of claims 2 or 3 wherein said blend of oils comprises by weight about 20% to about 50% canola oil, about 5% to about 35% medium chain triglycerides, about 5% to about 30% fish oil, about 5% to about 30% borage oil, and about 2.5% to about 6.0% soy lecithin.

5. A liquid nutritional product for enteral feeding comprising a blend of oils such that the nutritional product comprises certain fatty acids expressed as percentages by weigh to total fatty acids, as follows:

| FATTY ACID | % OF TOTAL FATTY ACIDS |
|---|---|
| Oleic acid (18:1n9) | 20.8–28.2 |
| Linoleic acid (18:2n6) | 13.5–18.3 |
| Gamma-Linolenic acid (18:3n6) | 3.9–5.3 |
| Alpha-Linolenic acid (18:3n3) | 2.7–3.7 |
| Stearidonic acid (18:4n3) | 0.71–0.97 |
| Eicosapentaenoic acid (20:5n3) | 4.25–5.75 |
| Docosahexaenoic acid (22:6n3) | 2.1–2.9 | and, by weight, the ratio of fatty acids from the group consisting of Linoleic acid (18:2n6), Gamma-Linolenic acid (18:3n6), and Arachidonic acid (20:4n6) to fatty acids from the group consisting of Alpha-Linolenic acid (18:3n3), Stearidonic acid (18:4n3), Eicosapentaenoic acid (20:5n3), Docosapentaenoic acid (22:5n3) and Docosahexaenoic acid (22:6n3) is in the range of about 1.5 to about 3.0, the ratio of Linoleic acid (18:2n6) to Alpha-Linolenic acid is in the range of about 3.0 to about 10.0, and the ratio of the sum of Eicosapentaenoic acid (20:5n3) and Docosahexaenoic acid (22:6n3) to Gamma-Linolenic acid (18:3n6) is in the range of about 1.0 to about 10.0.

6. A liquid nutritional product for enteral feeding as described in claim 5 wherein the nutritional product comprises certain fatty acids, expressed as percentages by weight of total fatty acids, as follows:

| FATTY ACID | % OF TOTAL FATTY ACIDS |
|---|---|
| Oleic acid (18:1n9) | 22.1–27.0 |
| Linoleic acid (18:2n6) | 14.3–17.5 |
| Gamma-Linolenic acid (18:3n6) | 4.1–5.1 |
| Alpha-Linolenic acid (18:3n3) | 2.9–3.5 |
| Stearidonic acid (18:4n3) | 0.76–0.92 |
| Eicosapentaenoic acid (20:5n3) | 4.5–5.5 |
| Docosahexaenoic acid (22:6n3) | 2.25–2.75 |

7. A liquid nutritional product for enteral feeding as described in claim 5 wherein the nutritional product comprises certain fatty acids, expressed as percentages by weight of total fatty acids, as follows:

| FATTY ACID | % OF TOTAL FATTY ACIDS |
|---|---|
| Oleic acid (18:1n9) | about 24.5 |
| Linoleic acid (18:2n6) | about 15.9 |
| Gamma-Linolenic acid (18:3n6) | about 4.6 |
| Alpha-Linolenic acid (18:3n3) | about 3.2 |
| Stearidonic acid (18:4n3) | about 0.84 |
| Eicosapentaenoic acid (20:5n3) | about 5.0 |
| Docosahexaenoic acid (22:6n3) | about 2.5 |

8. A liquid nutritional product for enteral feeding according to any one of claims 5–7 wherein, by weight, the ratio of fatty acids from the group consisting of Linoleic acid (18:2n6), Gamma-Linolenic acid (18:3n6), and Arachidonic acid (20:4n6) to fatty acids from the group consisting of Alpha-Linolenic acid (18:3n3), Stearidonic acid (18:4n3), Eicosapentaenoic acid (20:5n3), Docosapentaenoic acid (22:5n3) and Docosahexaenoic acid (22:6n3) is about 1.72, the ratio of Linoleic acid (18:2n6) to Alpha-Linolenic acid (18:3n3) is about 4.96, and the ratio of the sum of Eicosapentaenoic acid (20:5n3) and Docosahexaenoic acid (22:6n3) to Gamma-Linolenic acid (18:3n6) is about 1.64.

9. A liquid nutritional product for enteral feeding according to any one of claims 5–7 wherein said blend of oils comprises canola oil, medium chain triglycerides, fish oil, borage oil, and soy lecithin.

10. A liquid nutritional product for enteral feeding according to claim 9 further comprising beta carotene, vitamin E, vitamin C, taurine, and selenium.

11. A liquid nutritional product for enteral feeding according to any one of claims 5–7 wherein, by weight, the ratio of fatty acids from the group consisting of Linoleic acid (18:2n6), Gamma-Linolenic acid (18:3n6), and Arachidonic acid (20:4n6) to fatty acids from the group consisting of Alpha-Linolenic acid (18:3n3), Stearidonic acid (18:4n3), Eicosapentaenoic acid (20:5n3), Docosapentaenoic acid (22:5n3) and Docosahexaenoic acid (22:6n3) is about 1.72, the ratio of Linoleic acid (18:2n6) to Alpha-Linolenic acid (18:3n3) is about 4.96, and the ratio of the sum of Eicosapentaenoic acid (20:5n3) and Docosahexaenoic acid (22:6n3) to Gamma-Linolenic acid (18:3n6) is about 1.64.

12. A liquid nutritional product for enteral feeding according to any one of claims 5–7 further comprising at least one nutrient selected from the group consisting of beta-carotene, vitamin E, vitamin C, taurine and selenium.

13. A liquid nutritional product for enteral feeding according to claim 8 of claims 5–7 further comprising at least one nutrient selected from the group consisting of beta-carotene, vitamin E, vitamin C, taurine and selenium.

14. A liquid nutritional product for enteral feeding comprising a blend of oils comprises by weight about 20% to about 50% canola oil, about 5% to about 35% medium chain triglycerides, about 50% to about 30% fish oil, about 5% to about 30% borage oil, and about 2.5% to about 6.0% soy lecithin, said blend of oils as a whole, by weight, having a ratio of fatty acids from the group consisting of Linoleic acid (18:2n6), Gamma-Linolenic acid (18:3n6), and Arachidonic acid (20:4n6) to fatty acids from the group consisting of Alpha-Linolenic acid (18:3n3), Stearidonic acid (18:4n3), Eicosapentaenoic acid (20:5n3), Docosapentaenoic acid (22:5n3) and Docosahexaenoic acid (22:6n3) in the range of about 1.5 to about 3.0, a ratio of Linoleic acid (18:2n6) to Alpha-Linolenic acid (18:3n3) in the range of about 3.0 to about 10.0, and a ratio of the sum of Eicosapentaenoic acid (20:5n3) and Docosahexaenoic acid (22:6n3) to Gamma-Linolenic acid (18:3n6) in the range of about 1.0 to about 10.0.

15. A liquid nutritional product for enteral feeding according to claim 14 wherein the blend of oils comprises by weight about 30% to about 35% canola oil, about 20% to about 30% medium chain triglycerides, about 15% to about 25% fish oil, about 15% to about 25% borage oil, and about 2.5% to about 4.0% soy lecithin.

16. A liquid nutritional product for enteral feeding according to claim 14 wherein the blend of oils comprises by weight about 31.8% canola oil, about 25.0% medium chain triglycerides, about 20.0% fish oil, about 20% borage oil, and about 3.2% soy lecithin.

17. A liquid nutritional product for enteral feeding according to any one of claims 14–16 further comprising of at least one nutrient selected from the group consisting of beta-carotene, vitamin E, vitamin C, taurine and selenium.

18. A liquid nutritional product for enteral feeding according to any one of claims 14–16 further comprising about 3500 mcg/L to about 6500 mcg/L of beta-carotene, about 150 IU/L to about 450 IU/L of vitamin E, and about 450 mg/L to about 850 mg/L of vitamin C.

19. A liquid nutritional product for enteral feeding according to claim 18 further comprising about 250 mg/L to about 350 mg/L of taurine.

20. A liquid nutritional product for enteral feeding according to any one of claims 14–16 further comprising 4000 mcg/L to about 6000 mcg/L of beta-carotene, about 200 IU/L to about 400 IU/L of vitamin E, and about 550 mg/L to about 750 mg/L of vitamin C.

21. A liquid nutritional product for enteral feeding according to claim 20 further comprising about 275 mg/L to about 325 mg/L of taurine.

22. A liquid nutritional product for enteral feeding according to any one of claims 14–16 further comprising 5000 mcg/L of beta-carotene, about 300 IU/L of vitamin E, and about 650 mg/L of vitamin C.

23. A liquid nutritional product for enteral feeding according to claim 22 further comprising about 300 mg/L of taurine.

24. A method of improving pulmonary function in a mammalian creature having respiratory insufficiency by enterally feeding to said mammalian creature a liquid nutritional product comprising: (a) a source of fat which is a blend of oils which in combination, by weight, have a ratio of fatty acids from the group consisting of Linoleic acid (18:2n6), Gamma-Linolenic acid (18:3n6), and Arachidonic acid (20:4n6) to fatty acids from the group consisting of Alpha-Linolenic acid (18:3n3), Stearidonic acid (18:4n3), Eicosapentaenoic acid (20:5n3), Docosapentaenoic acid (22:5n3) and Docosahexaenoic acid (22:6n3) in the range of about 1.5 to about 3.0, a ratio of Linoleic acid (18:2n6) to Alpha-Linolenic acid (18:3n3) in the range of about 3.0 to about 10.0, and a ratio of the sum of Eicosapentaenoic acid (20:5n3) and Docosahexaenoic acid (22:6n3) to Gamma-Linolenic acid (18:3n6) in the range of about 1.0 to about 10.0; and (b) at least one nutrient selected from the group consisting of beta-carotene, vitamin E, vitamin C, and taurine.

25. A method of improving pulmonary function in a mammalian creature having respiratory insufficiency by enterally feeding to said mammalian creature a liquid nutritional product comprising a source of fat, about 45% to about 56% of the total calories in the product being provided by fat, the source of fat being a blend of oils which taken in combination, by weight, have a ratio of fatty acids from the group consisting of Linoleic acid (18:2n6), Gamma-Linolenic acid (18:3n6), and Arachidonic acid (20:4n6) to fatty acids from the group consisting of Alpha-Linolenic acid (18:3n3), Stearidonic acid (18:4n3), Eicosapentaenoic acid (20:5n3), Docosapentaenoic acid (22:5n3) and Docosahexaenoic acid (22:6n3) in the range of about 1.5 to about 3.0, a ratio of Linoleic acid (18:2n6) to Alpha-Linolenic acid (18:3n3) in the range of about 3.0 to about 10.0, and a ratio of the sum of Eicosapentaenoic acid (20:5n3) and Docosahexaenoic acid (22:6n3) to Gamma-Linolenic acid (18:3n6) in the range of about 1.0 to about 10.0; and said product further comprising about 3500 mcg/L to about 6500 mcg/L of beta carotene, about 150 IU/L to about 450 IU/L of vitamin E, and about 450 mg/L to about 850 mg/L of vitamin C.

26. A method of improving pulmonary function in a mammalian creature having respiratory insufficiency by enterally feeding to said mammalian creature a liquid nutritional product comprising a blend of oils such that the nutritional product comprises certain fatty acids expressed as percentages by weight of total fatty acids, as follows:

| FATTY ACID | % OF TOTAL FATTY ACIDS |
| --- | --- |
| Oliec acid (18:1n9) | 20.8–28.2 |
| Linoleic acid (18:2n6) | 13.5–18.3 |
| Gamma-Linolenic acid (18:3n6) | 3.9–5.3 |
| Alpha-Linolenic acid (18:3n3) | 2.7–3.7 |
| Stearidonic acid (18:4n3) | 0.71–0.97 |
| Eicosapentaenoic acid (20:5n3) | 4.25–5.75 |
| Docosahexaenoic acid (22:6n3) | 2.1–2.9 | and, by weight, the ratio of fatty acids from the group consisting of Linoleic acid (18:2n6), Gamma-Linolenic acid (18:3n6), and Arachidonic acid (20:4n6) to fatty acids from the group consisting of Alpha-Linolenic acid (18:3n3), Stearidonic acid (18:4n3), Eicosapentaenoic acid (20:5n3), Docosapentaenoic acid (22:5n3) and Docosahexaenoic acid (22:6n3) in the range of about 1.5 to about 3.0, the ratio of Linoleic acid (18:2n6) to Alpha-Linolenic acid (18:3n3) in the range of about 3.0 to about 10.0, and a ratio of the sum of Eicosapentaenoic acid (20:5n3) and Docosahexaenoic acid (22:6n3) to Gamma-Linolenic acid (18:3n6) is in the range of about 1.0 to about 10.0.

27. A method of improving pulmonary function in a mammalian creature having respirator insufficiency by enterally feeding to said mammalian creature a liquid nutritional product comprising a blend of oils which comprises by weight about 20% to about 50% canola oil, about 5% to about 35% medium chain triglycerides, about 5% to about 30% fish oil, about 5% to about 30% borage oil, and about 2.5% to about 6.0% soy lecithin, said blend of oils as a whole, by weight, having a ratio of fatty acids from the group consisting of Linoleic acid (18:2n6), Gamma-Linolenic acid (18:3n6), and Arachidonic acid (20:4n6) to fatty acids from the group consisting of Alpha-Linolenic acid (18:3n3), Stearidonic acid (18:4n3), Eicosapentaenoic acid (20:5n3), Docosapentaenoic acid (22:5n3) and Docosahexaenoic acid (22:6n3) in the range of about 1.5 to about 3.0, a ratio of Linoleic acid (18:2n6) to Alpha-Linolenic acid (18:3n3) in the range of about 3.0 to about 10.0, and a ratio of the sum of Eicosapentaenoic acid (20:5n3) and Docosahexaenoic acid (22:6n3) to Gamma-Linolenic acid (18:3n6) in the range of about 1.0 to about 10.0.

* * * * *

UNITED STATES PATENT AND TRADEMARK OFFICE
CERTIFICATE OF CORRECTION

PATENT NO. : 5,223,285
DATED : June 29, 1993
INVENTOR(S) : Stephen J. DeMichele and Timothy J. Gregory It is certified that error appears in the above-indentified patent and that said Letters Patent is hereby corrected as shown below:

Title page, item [57]
In the fourth line of the Abstract "[n-(6) to n-(3)]" should be deleted.

Signed and Sealed this

Twenty-second Day of February, 1994

Attest:

BRUCE LEHMAN

Attesting Officer *Commissioner of Patents and Trademarks*